United States Patent [19]

Harris et al.

[11] Patent Number: 5,032,667
[45] Date of Patent: Jul. 16, 1991

[54] AMIDE AND/OR IMIDE CONTAINING POLYMERS AND MONOMERS FOR THE PREPARATION THEREOF

[75] Inventors: James E. Harris, Piscataway; Abe Berger, Summit; Vilas M. Chopdekar; Markus Matzner, both of Edison, all of N.J.; James Spanswick, Wheaton, Ill.

[73] Assignee: Amoco Corporation, Chicago, Ill.

[21] Appl. No.: 453,783

[22] Filed: Dec. 20, 1989

Related U.S. Application Data

[60] Division of Ser. No. 122,017, Nov. 18, 1987, Pat. No. 4,925,916, which is a division of Ser. No. 946,261, Dec. 24, 1986, Pat. No. 4,713,438, which is a continuation-in-part of Ser. No. 760,592, Jul. 30, 1985, abandoned, and a continuation-in-part of Ser. No. 933,422, Nov. 21, 1986, abandoned, which is a continuation of Ser. No. 757,933, Jul. 23, 1985, abandoned.

[51] Int. Cl.$^5$ .................... C08G 69/26; C08G 73/14; C08L 79/08
[52] U.S. Cl. .................... 528/125; 528/126; 528/128; 528/170; 528/172; 528/173; 528/176; 528/189; 528/229; 528/230; 528/289; 528/292; 528/310; 528/322; 528/335; 528/336; 528/337; 528/350; 528/351; 528/353; 525/425; 525/433; 525/436; 524/600
[58] Field of Search ............... 528/125, 126, 128, 170, 528/172-173, 176, 189, 229-230, 289, 292, 310, 322, 335, 336, 337, 350, 351, 353; 525/425, 433, 436; 524/600

[56] References Cited

U.S. PATENT DOCUMENTS

| | | | |
|---|---|---|---|
| 4,061,623 | 12/1977 | Onder | 528/350 |
| 4,066,631 | 1/1977 | Dimmig | 528/350 |
| 4,291,149 | 9/1981 | Keske et al. | 528/350 |
| 4,309,528 | 1/1982 | Keske et al. | 528/350 |
| 4,501,883 | 2/1985 | Walrath et al. | 528/337 |
| 4,681,928 | 7/1987 | Berger et al. | 528/185 |
| 4,713,438 | 12/1987 | Harris et al. | 528/337 |
| 4,861,855 | 8/1989 | Backrath et al. | 528/125 |
| 4,879,354 | 11/1989 | Harris et al. | 525/433 |
| 4,925,916 | 5/1990 | Harris et al. | 528/353 |
| 4,981,942 | 1/1991 | Backrath et al. | 528/125 |

FOREIGN PATENT DOCUMENTS 61-014218 1/1986 Japan .
61-126136 6/1986 Japan .
61-126137 6/1986 Japan .

*Primary Examiner*—John Kight, III
*Assistant Examiner*—P. Hampton-Hightower
*Attorney, Agent, or Firm*—Gary J. Cunningham; William H. Magidson; Ralph C. Medhurst

[57] ABSTRACT

Described herein are amide and/or imide containing polymers based on novel monomers that contain isoalkylidene bridges. These polymers have excellent toughness combined with high temperature stability, low water absorption, and good melt-fabricability.

21 Claims, No Drawings

AMIDE AND/OR IMIDE CONTAINING POLYMERS AND MONOMERS FOR THE PREPARATION THEREOF

REFERENCE TO RELATED APPLICATIONS

This is a division of application Ser. No. 122,017, filed Nov. 18, 1987, now U.S. Pat. No. 4,925,916, which is a divisional application of 946,261 filed Dec. 24, 1986, now U.S. Pat. No. 4,713,438, which is a continuation-in-part of Ser. No. 760,592 filed Jul. 30, 1985, abandoned, and Ser. No. 933,422, filed Nov. 21, 1986, abandoned, said Ser. No. 933,422 is a continuation of Ser. No. 757,933, filed Jul. 23, 1985, abandoned.

FIELD OF THE INVENTION

This invention is directed to novel amide and/or imide containing polymers. The materials display excellent toughness combined with high temperature stability, low water absorption, and good melt-fabricability. They are useful in the manufacture of extruded film, continuous fiber composites, and injection molded articles. They are based on novel monomers that comprise isoalkylidene bridges in their structures. The preparation of these monomers is also described.

BACKGROUND OF THE INVENTION

Aromatic polyamides are a well known class of polymers. They are discussed by Yen-Chen Yen in Stanford Research Institute Report No. 94 (Menlo Park, Calif.) entitled "Polyamides Other Than Nylons 6 and 66". They are also the subject of several papers given at the American Chemical Society meeting in April 1976-cf. Polymer Preprints, Vol. 17, No. 1, pp. 47-52, 53-58, 59-64, etc . . . ; and are described in numerous U.S. and foreign patents. See, for example, U.S. Pat. Nos. 3,063,966; 3,671,542; British Patent 1,246,168; German Patent Application 1,951,077; French Patent 1,199,458; and Japanese Patent Application 56/166,229.

Aromatic polyamides are generally high melting, high glass-transition temperature polymers; they display excellent mechanical properties and heat resistance and are noted for their very good chemical resistance. The main drawback of these materials is the fact that they are often extremely difficult to process. Thus, the polyamide (1)

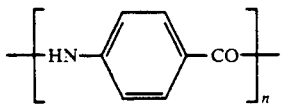
(1)

is always spun from solution. Suitable solvents are sulfuric acid (nearly anhydrous or oleum), chlorosulfonic acid, fluorosulfonic acid, or combinations of lithium chloride with phosphorus compounds such as N,N-dimethyldimethyl phosphinamide and the like; spinning may also be effected using nitrogen-containing solvents, such as, for example, N,N,N$^1$N$^1$-tetramethylurea, optionally in combination with an inorganic salt.

Better solubility characteristics are encountered with aromatic polyamides that are not wholly para-linked. Thus, high molecular weight polyamide (2) can be prepared via the

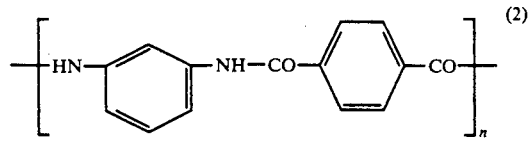
(2)

reaction of isophthaloyl chloride with m-phenylene diamine in chloroform, in the presence of triethylamine as the acid acceptor. See Morgan, Polymer Preprints, Vol. 17, No. 1, p. 47. However, these polyamides are also very difficult to process.

Improved melt-fabricability characteristics were claimed for polyamides possessing a flexibilizing oxygen bridge within their molecules. Thus, according to Japanese Patent Application 56/166,229 polyamides based on the diamine (3) and iso- and/or terephthaloyl chlorides

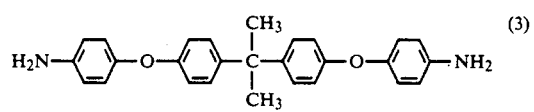
(3)

possess good thermal stability, good electrical and mechanical properties and can be molded into useful shapes. The moldability is still poor, however; in order to improve ease of fabrication the subject polyamides were plasticized using, for example, various bisphthalimides, as described in Japanese Patent Application 59/147,046 and 59/147,047, siloxanes (see Japanese Patent Application 59/142,247), and the like. Also, processibility was presumably improved when the polyamides in question were blended with poly(aryl ether sulfones) such as (4) or with polyarylates such as (5). See Japanese Patent Applications 58/52,348 and 58/52,347.

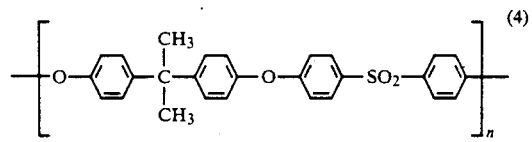
(4)

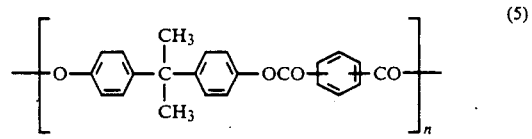
(5)

Polyimides are a well known class of polymers. They are described by Cassidy in Kirk-Othmer, Encyclopedia of Chemical Technology, 3rd Ed., Vol. 18, pp. 704-719. C. Arnold, Jr., in the Journal of Polymer Science; Macromolecular Reviews, Vol. 14, pp. 265-378 (1979) devotes a portion of the article entitled: "Stability of High-Temperature Polymers", at pp. 322-333, to polyimides. They are also discussed by Elkin in Stanford Research Institute Report Number 86 (Menlo Park, CA.) entitled "High Temperature Polymers" (1973). Polyimides and amide-imides are reviewed in Cotter, et al., Ring Forming Polymerizations, Vol. B.2 pp. 1-67, Academic Press, New York, (1972). The physical and chemical characteristics of polyimides and the subclass of poly(amide-imides) have been well documented.

In general, polyimides (especially aromatic polyimides) have excellent heat resistance but are difficult to process. The same is generally true with respect to aromatic poly(amide-imides). Thus, according to P. E. Cassidy et al. (cited above), "wholly aromatic polyimide molding powders must be fabricated by sintering at high temperature and pressure". Injection molding and extrusion are thus not possible. J. M. Aducci in Polymides, K. L. Mittal, Editor, 1984, published by Plenum Press, New York, states on page 1024:

Polyimides, produced by the chemical reaction of an aromatic dianhydride and an aromatic diamine, were the first of the aromatic thermally stable polymers introduced in the mid-1950's. Polyimides did not behave as thermoplastics even though they had linear structures. Polymer backbones comprised of rigid, inherently stable, aromatic phenylene and imide rings imparted polyimides with excellent thermal oxidative properties and at the same time made them exceedingly difficult to process because of their high and sometimes indeterminate melting points."

According to T. P. Gannett el al., in U.S. Pat. No. 4,485,140, the polyimide of the structural formula:

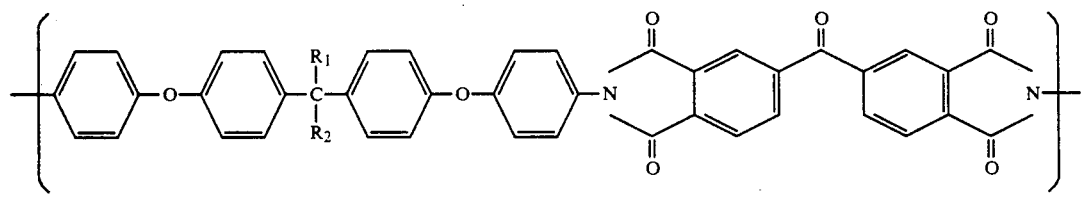

where $R_1$ and $R_2$ are —$CH_3$ or —$CF_3$, is typical of aromatic polyimides which are generally infusible. According to Alberino et al., U.S Pat. No. 3,708,458, a polyimide having recurring units of the formula:

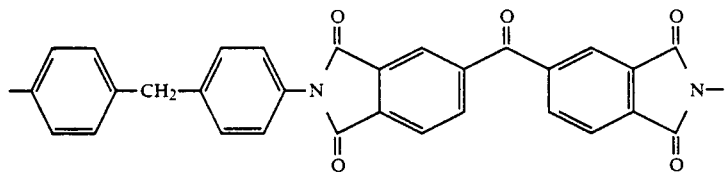

"possesses highly useful structural strength properties but . . . is difficult to mold, by compression at elevated temperatures, because of its relatively poor flow properties in the mold". The patentees developed a polyimide to overcome, to some extent, these difficulties by including in the polymer backbone a certain proportion of the reaction product of 3,3',4,4'-benzophenone tetracarboxylic dianhydride with 2,4- or 2,6-toluene diamine (or the corresponding diisocyanates). The copolymers were regarded as having better flow properties in the mold even though such difficult molding procedures as "sintering or hot processing" were the criteria used.

Thus, it can be said that aromatic imide-based polymers in general do not lend themselves easily to melt fabrication except perhaps by compression molding.

Recently, the processability of some of these imide-based materials has been improved by blending or alloying them with other resins which are themselves more easily melt processable by virtue of being more easily thermoformed and injection molded.

Thus, it is desirable to prepare amide and/or imide containing polymers which would combine toughness with ease of melt fabrication without the necessity of using a monomeric and/or a polymeric additive. It is obviously also highly desirable that the novel materials retain the very good high temperature properties that are characteristic of aromatic polyamides, poly(amide-imides), and polyimides. Also, these latter resins are known for their generally undesirably high water absorption (3 to 10 wt. %, depending on the particular polymer). High water absorption affects deleteriously the dimensional and the thermal stability of a product; it reduces its mechanical property values and limits its fabrication latitude. Therefore, the preparation of an amide and/or imide containing polymer displaying a consistently low, e.g. 3 weight percent, water uptake is a very important and worthwhile goal.

THE INVENTION

It has now been discovered that polyamides, poly(amide-imides), and polyimides that contain isoalkylidene and preferably isopropylidene bridges meet the criteria enumerated above. These polymers display excellent mechanical properties and toughness, good high temperature properties, good melt-processibility, and low water absorption (<3 weight percent). The polymers are based on novel monomers, the preparation of which is also described herein.

A. The Monomers

The novel monomers of the instant invention are the diamines (6), or (7), the tetracarboxylic acid dianhydrides (8) and the diacids (9):

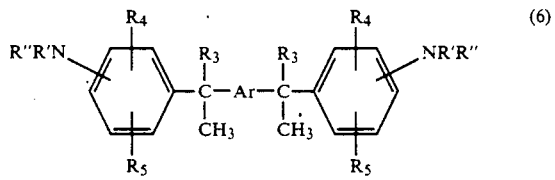

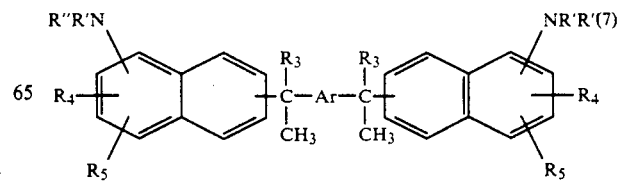

-continued

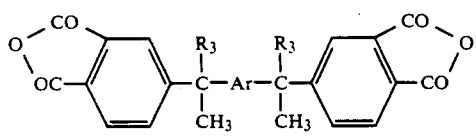 (8)

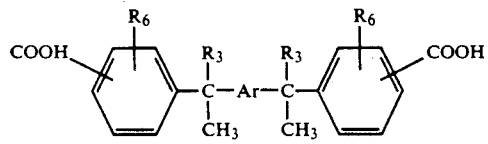 (9)

or isomers thereof.

The starting materials for the preparation of these monomers are the diisoalkenyl compounds (10) or their functionalized derivatives (11):

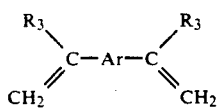 (10)

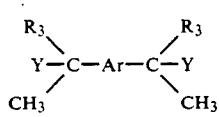 (11)

In the formulae above $R_3$ is a phenyl, $CF_3$, or an alkyl group having from 1 to 10 carbon atoms; it is preferably methyl. The Ar's are:

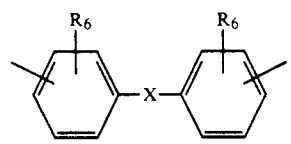

wherein X can be a chemical bond, O, S, SO, $SO_2$,

$CH_2$, an alkylene or alkylidene having from 2 to 8 carbon atoms, a cycloalkylene or cycloalkylidene having from 5 to 14 carbon atoms, or a phenylene group which may be substituted by an alkyl or alkoxy group having from 2 to 4 carbon atoms, or by a halogen; the group Ar may also be

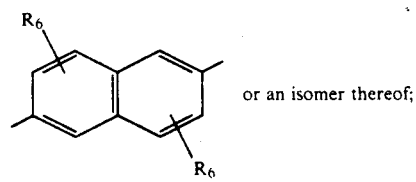

or an isomer thereof;

and

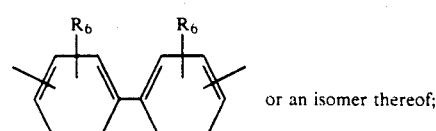

or an isomer thereof;

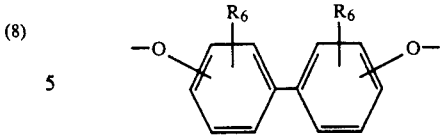

or an isomer thereof. Y can be a halogen, a hydroxy group, an alkoxy or a phenoxy group; $R_6$ is an inert substituent such as alkyl, having more than 1 carbon atom, aryl or aryloxy of 6 to 20 carbon atoms or halogen. The acid-catalyzed condensation of (10) or of (11) with an aniline (12),

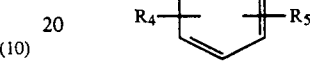 (12)

or a naphthylamine (12a)

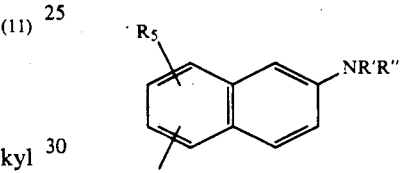 (12a)

or an isomer thereof wherein R' and R" are independently hydrogen, straight chain or branched $C_1$ to $C_{10}$ alkyl, and $C_6$ to $C_{20}$ aryl; and wherein $R_4$ and $R_5$ are inert substituents which can be independently hydrogen, halogen, alkyl or alkoxy having from 1 to 4 carbon atoms, and aryl or aryloxy having from 6 to 20 carbon atoms, yields the diamines (6) and (7). The reaction is illustrated in equation (I) for the case of Ar in which X is a chemical bond:

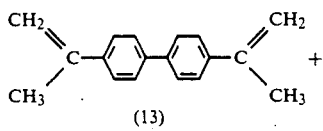 (I)

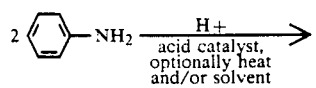

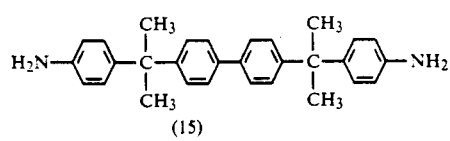

Similarly, the Friedel-Crafts reactions of (10) or of (11) with toluene or o-xylene, or substituted derivatives thereof where the substituent is $R_6$ as defined above, followed by oxidation of the methyl groups leads to the acid (9) or anhydride (8) monomers. Typical preparations are given in equations (II) and (III).

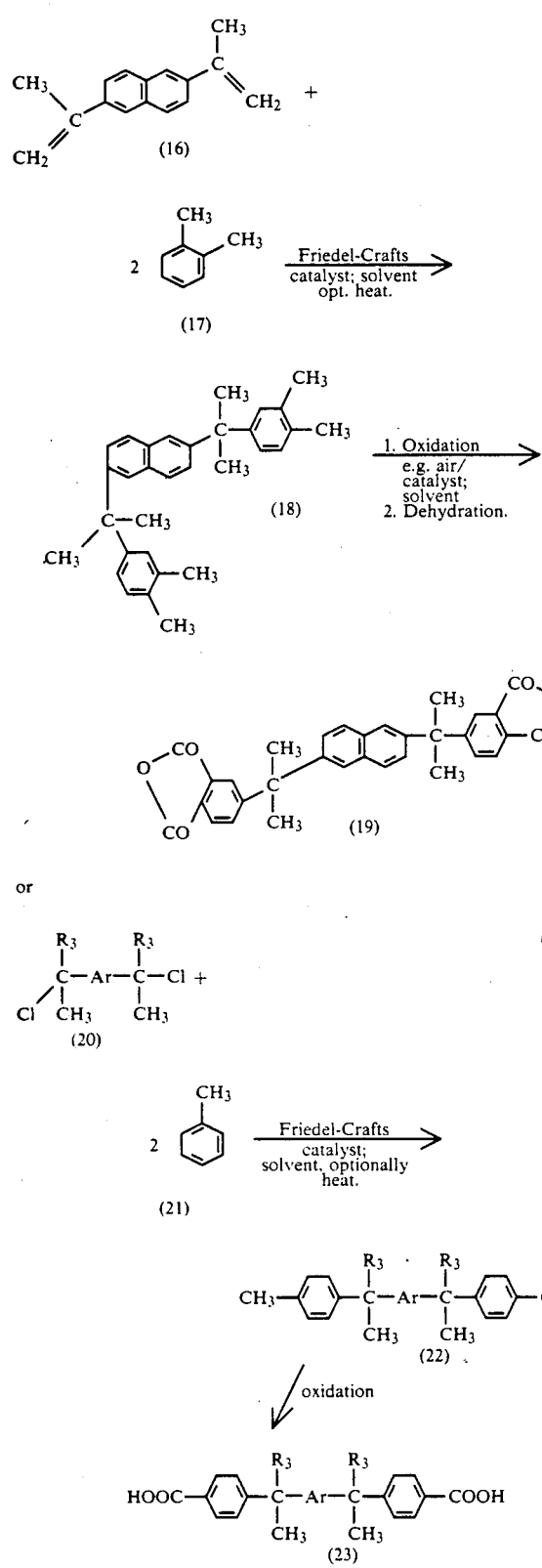

In the formulae above $R_3$ and Y are as defined above. The Friedel-Crafts reaction is followed by oxidation to yield the corresponding acids. Note that this variant is possible only when the group Ar does not contain electron-withdrawing groups such as $SO_2$, CO, and the like.

The diisoalkenyl derivatives (10) can be prepared by dehydrogenation of the corresponding diisoalkyl aromatics using methods that have been described for the catalytic dehydrogenation of diisopropylbenzene; see, for example, Hering, Zeitschr. Chem., Vol. 5, p. 149, 1965; and Balandin and Marukyan, Compt. Rend. Acad. Sci. URSS, Vol. 55, p. 121, 1947. The diisoalkenyl compounds are also available via the dehydration of the corresponding dicarbinols; see, for example, British Patent 846,616. In addition, the diisoalkenyl materials may be obtained by the dehydrohalogenation of (11), wherein Y is a halogen.

Compounds (11) can be prepared using routes that are known to those skilled in the art. Thus, the dihalo compounds (Y=halogen) can be obtained in high yields by halogenation of the corresponding diisoalkyl derivatives. The reaction of the diacetylated aromatic $$CH_3\ CO\text{-}Ar\ CO\ CH_3 \qquad (28)$$

with the Grignard reagent ($R_3MgX$) leads to the material wherein Y=OH; in another embodiment, the dihydroxy compound may also be prepared by the hydrolysis of the corresponding dihalide. Reaction of the latter, under alkaline conditions, with an alcohol or a phenol yields the alkoxy and phenoxy products.

The reactions of compounds (10) with an aniline (12) or a naphthylamine (12a) are generally performed as described in U.S. Pat. Nos. 3,200,152 and 3,424,795. In these reactions, particularly high yields of the new amino compounds (6) and (7) are obtained, if the reaction components are allowed to react with one another, with heating, in the presence of a salt of one of the above-mentioned aromatic amino compounds, with a strong acid, for example, hydrogen fluoride, hydrogen chloride, hydrogen bromide, perchloric acid, sulphuric acid or benzene- or toluene sulphonic acid, or in the presence of an acid ionic exchanger or an acidic earth, as a catalyst.

The above acid and/or anhydride monomers can also be prepared via the Friedel-Crafts reaction of the compound HArH, where Ar is as defined above, with methy-substituted derivatives of the formulae (24), (25), (26) or (27).

In this reaction, the aromatic amino compounds can be used in stoichiometric amounts with respect to the diisoalkenyl derivatives (10), i.e., for each mole of the diisoalkenyl material (10) there are added two moles of the aniline (12) or of the naphthulamine (12a) to the reaction mixture. Better results, however, can often be obtained by using an excess of the aromatic amino compound. Good results are obtained, for example, by the addition of up to 4 moles of the aromatic amino compound per mole of the diisoalkenyl derivative (10).

Furthermore, it is also possible to replace a certain amount of the aromatic amino compound with the corresponding salt of the aromatic amino compound with one of the above mentioned strong acids. The catalysts which can be used according to the present invention can be used in varying amounts, ranging from 0.05 to 4 moles of the catalyst salt, preferably 2 moles, per mole of the diisoalkenyl aromatic (10). Side reactions, such as for example, the polymerization of diisopropenyl derivatives to indanes, which is known to take place in the presence of Friedel-Crafts catalysts such as tin tetrachloride or aluminum chloride, surprisingly hardly occur in the instant reaction.

The reaction temperature is generally in the range of about 190° to 210° C. The reaction time varies from about 30 minutes to 3 hours.

The condensation of the dihalide (11) (Y=halogen) with an aniline (12) or with a naphthylamine (12a) is best performed by heating an excess (i.e., >2 moles and up to 4 moles of the aromatic amine with the dihalocompound. The reaction takes place at about 100° to 250° C.; it is usually over after about 10 to 30 minutes; it proceeds without the use of any catalyst. In many cases, the hydrogen halide salt of the new diamine (6) or (7) thereby crystallizes from the reaction mixture. The condensation of (11) (Y=hydroxy, alkoxy or phenoxy) with an aniline (12) or with a naphthylamine (12a) is carried out in the presence of a salt of the amine with a strong acid as described above for the diisoalkenyl case.

The Friedel-Crafts coupling of (10) or of (11) with toluene or with o-xylene can be performed as described in, for example, Carson et al., J. Appl. Chem. Biotechnol., Vol. 26, pp. 171-183, 1976; Cope et al., J. Am. Chem. Soc., Vol. 31, p. 1393, 1966; Charbonneau, J. Polymer Sci., Vol. 16, p. 197, 1978; Potts et al., J. Amer. Chem. Soc., Vol. 61, p. 2553, 1939; and in Coscia et al., J. Org. Chem., 26, p. 1398, 1961. The reaction is conducted in the presence of typical catalysts such as concentrated sulfuric acid, aluminum chloride, or ferric chloride. The amounts of the Lewis acid may vary, depending on the case, from catalytic to molar and even higher. The reactions take place in solvents such as nitrobenzene; in other cases an excess of the toluene or o-xylene may serve as the solvent.

The oxidation of aromatically bound methyl groups to the carboxylic acid function is a known reaction that can be performed using a variety of oxidizing agents. Thus, one can use potassium permanganate in aqueous pyridine as disclosed in Koton et al., Zhurn. Org. Khim., Vol. 4, No. 5, pp. 774-776, 1978; and in Marvel et al., J. Am. Chem. Soc., Vol. 80, p. 1197, 1958. Similar permanganate oxidations are described in U.S. Pat. Nos. 3,812,159 and 2,712,543. Other useful reagents for the subject oxidation include aqueous potassium dichromate (cf. Shechter et al., J. Org. Chem., Vol. 30, p. 1453, 1965), chromic oxide in acetic acid (Schriesheim, J. Org. Chem., Vol. 28, p. 410, 1963); potassium permanganate in combination with a crown ether in benzene (Sam et al., J. Am. Chem. Soc., Vol. 94, p. 4024, 1972); and nitric acid (U.S. Pat. No. 2,712,543). The most attractive way, however, to perform these oxidations on an industrial scale is the catalytic oxidation using oxygen and an appropriate catalyst in a solvent (usually acetic acid). The catalyst is based on a transition metal and must contain a source of bromide. Typical catalysts are manganese dibromide, or cobalt or nickel acetate in conjunction with sodium bromide. These processes are described in, for example, U.S. Pat. No. 3,781,340 and in Carson et al., J. Appl. Chem. Biotechnol., Vol. 26, pp. 171-183, 1976.

B. The Polymers

The polyamides, poly(amide-imides), and polyimides of the instant invention are made from the monomers (6), (7), (8), and (9) wherein at least one R' or R" or both are hydrogens. Other diamines, dianhydrides, and diacids, as well as tricarboxylic acid monoanhydrides or derivatives thereof, may be employed in conjunction with the above monomers. It is necessary, however, that the final polymer contain at least 50 mole % of the combination of (6), (7), (8), and (9) based on the total monomers used.

The diamines that are useful in addition to (6) and (7) are of the formula $H_2NAr'NH_2$ where $Ar'$ is a divalent aromatic radical which is preferably

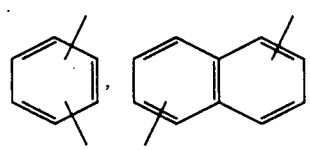

or isomers thereof, and

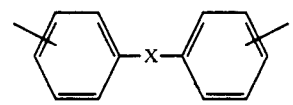

where X is as defined above.

Small amounts, of up to 25 mole %, preferably less than 10 mole % (based on the total amine monomers), of a straight chain or branched aliphatic or of an arylaliphatic diamine may also be used in the preparation of the instant polymers.

The diacids that are useful in addition to the compounds (9) are of the formula HOOC Ar' COOH where Ar' is as defined above. Up to 25 mole %, preferably less than 10 mole % (based on the total acid monomers), of a straight chain or branched aliphatic diacid or of an arylaliphatic diacid may also be used. Furthermore, substituted aromatic diacids, such as

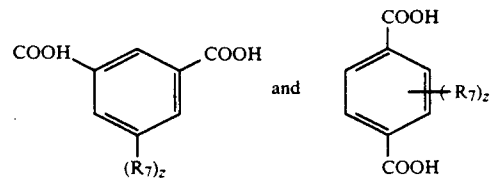

where $R_7$ is a straight chain or branched $C_1$ to $C_8$ alkyl group, a halogen, or a $C_1$ to $C_8$ straight chain or branched alkoxy group, and where Z can be 1, 2 or 3, are also useful.

The tricarboxylic acid monoanhydrides that can be employed for the purposes of the instant invention are of the general formula

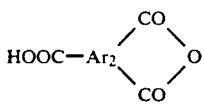
(29)

where $Ar_2$ is a trivalent aromatic radical; $Ar_2$ is preferably

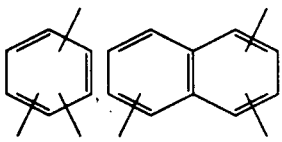

or isomers thereof, and

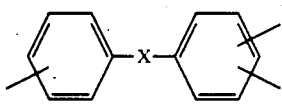

where X is as defined above.

The tetracarboxylic acid dianhydrides that may be used in addition to the compounds (8) are of the formula

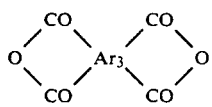
(30)

where $Ar_3$ is a tetravalent aromatic radical; $Ar_3$ is preferably

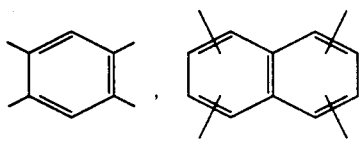

or isomer thereof and

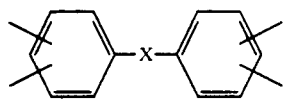

where X is as defined above.

The polymers are prepared by methods well known in the art. Thus, the aromatic polyamides can be prepared by a solution process, i.e., by reacting the acid chloride and the diamine in an appropriate solvent such as N-methylpyrrolidone, N,N,N',N'-tetramethylurea, N,N-dimethylacetamide, N-methylcaprolactam, hexamethylphosphoramide, chloroform, methylene chloride, and the like, optionally in the presence of an added inorganic salt such as lithium chloride or calcium chloride and/or in the presence of an added acid acceptor as described in, for example, U.S. Pat. Nos. 3,063,966 and 3,671,545; Morgan, Polymer Preprints, Vol. 17, No. 1, p. 47 (1976); Kwolek et al., ibid., p. 53, and in Fedorov et al., Vysokomolekulyarnye Soedin, Ser. B, 12, 3 (1970), pp. 205–8. Preferably, these low temperature solution polymerizations are accomplished by first preparing a cooled solution of the diamine or diamines in a solvent or mixture of solvents. To this solution is added the diacid chloride usually with stirring and cooling. Polymer precipitation frequently occurs within a few minutes and on other occasions the reaction mixture may gel. The polymerization may be stopped by agitating the reaction mixture with a polymer non-solvent, e.g., water, in a suitable blender. The polymer is then collected, washed, and dried.

The polyamides can also be prepared via the interfacial route as described in, for example, Ogata et al., Kobunshi Kagaku, 29, 4 (1972), pp. 275–7. Finally, these polymers can also be obtained by the reaction of a diisocyanate with a diacid. The polymerization was discussed in a paper presented at an American Chemical Society meeting-see Chapin, Polymer Preprints, Vol. 21, No. 2, p. 130 (1980).

Molecular weight control and better thermal stability are achieved by using appropriate end-capping reagents such as monoamines, monoacid chlorides, or monoisocyanates.

The preparation of the imide-containing materials is set forth, for example, in U.S. Pat. Nos. 3,208,458; 3,652,409; 3,179,634; 3,972,902; 3,355,427; 4,485,140 and 4,111,906.

The polyimides of the present invention are preferably prepared by the reaction of the appropriate dianhydride or dianhydrides with the appropriate diamine(s) followed by chemical dehydration of the intermediate poly(amide-acid). The sequence is illustrated in equation (IV) where $Ar_4$ is the tetravalent residuum

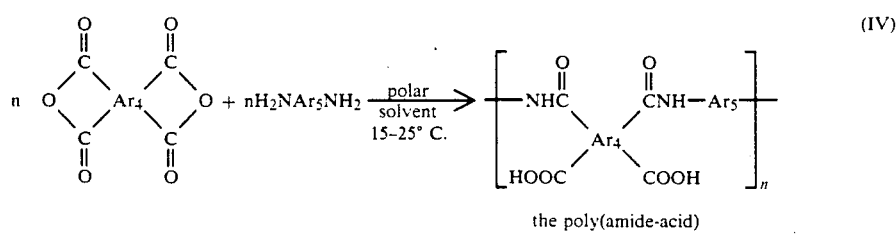
(IV)

the poly(amide-acid)

(31)  (32)  (33)

$(CH_3CO)_2O$/pyridine: room-temperature

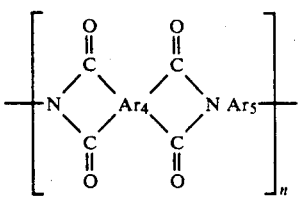

Final Polyimide (34)

of any of the dianhydrides and Ar₅ is the divalent residuum of any of the diamines discussed above.

The solvents useful in the solution polymerization process for synthesizing the polyamide-acid compositions are organic solvents whose functional groups do not react with either of the reactants (the diamines or the dianhydrides) to any appreciable extent. In addition to being inert to the system, and preferably, being a solvent for the polyamide-acid, the organic solvent must be a solvent for at least one of the reactants, preferably for both of the reactants. The normally liquid organic solvents of the N,N-dialkylcarboxylamide class are useful as solvents in the process. The preferred solvents are the lower molecular weight members of this class, particularly N,N-dimethylformamide and N,N-dimethylacetamide. Other useful solvents are: N,N-diethylformamide, N,N-diethylacetamide, N,N-dimethylmethoxyacetamide, N-methyl caprolactam, and the like. Other solvents which may be used include dimethylsulfoxide, N-methyl-2-pyrrolidone, tetramethyl urea, pyridine, dimethylsulfone, hexamethylphosphoramide, tetramethylene sulfone, formamide, N-methylformamide, butyrolactone and phenols such as m-cresol. The solvents can be used alone, in combinations of solvents, or in combination with poorer solvents such as benzene, benzonitrile, dioxane, xylene, toluene and cyclohexane.

Another group of solvents that are very useful for the preparation of polyimides as well as of poly(amide-imides) are the diaryl sulfones and diaryl ketones; they may be used alone or in combination with other solvents such as the hydrocarbons, chlorinated hydrocarbons, etc.. Typical representatives are diphenyl sulfone and benzophenone. These solvents are of interest because they allow for the use of high temperatures and are, therefore, adequate in cases where the amine reactivity is low; or in cases where low solubility of the polymer is encountered—in both instances use of higher reaction temperatures may be necessary. Also, the thermal cyclization of the poly(amide-acids) to the corresponding polyimides can be performed in the same solvent by simply increasing the temperature to the required level. The same is feasible with phenolic solvents such as the cresols; the diaryl sulfones and ketones have the added advantage of low toxicity, however.

For most combinations of diamines and dianhydrides falling within the definition given above, it is possible to form compositions of 100% poly(amide-acid) by conducting the reaction below 100° C. However, temperatures up to 175° C. and higher may be tolerated to provide shapeable compositions.

To obtain the maximum inherent viscosity, i.e., maximum degree of polymerization, for any particular combination of diamine, dianhydride, solvent, etc., and thus produce ultimately shaped articles such as films and filaments of optimum toughness, it has been found that the temperature throughout the reaction should be maintained below 60° C., preferably below 50° C.

The degree of polymerization of the poly(amide-acid) is subject to deliberate control. The use of equal molar amounts of the reactants under the prescribed conditions provides poly(amide-acids) of very high molecular weight. The use of either reactant in large excess limits the extent of polymerization. In addition to using an excess of one reactant to limit the molecular weight of the poly(amide-acid), a chain terminating agent such as phthalic anhydride may be used to "cap" the ends of the polymer chains. Typical useful capping agents are monoanhydrides or monoamines such as phthalic anhydride, aniline, p-methylaniline, and the amine (35) and anhydride (36) shown below:

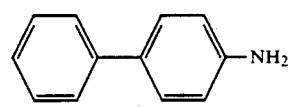

(35)

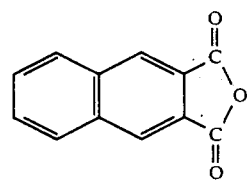

(36)

In the preparation of the poly(amide-acid), it is desired that the molecular weight be such that the inherent viscosity of the polymer is at least 0.1, preferably 0.3–1.5. The inherent viscosity is measured at 25° C. at a concentration of 0.5% by weight of the polymer in a suitable solvent such as N-methylpyrolidone.

The quality of organic solvent used in the process need only be sufficient to dissolve enough of one reactant, preferably the diamine, to initiate the reaction of the diamine and the dianhydride. It has been found that the most successful results are obtained when the solvent represents at least 60% of the final solution. That is, the solution should contain 0.05–40% of the polymeric component.

The second step of the process described in equation (IV) is performed by treating the poly(amide-acid) (33) with a dehydrating agent alone or in combination with a tertiary amine such as acetic anhydride or an acetic anhydride-pyridine mixture. The ratio of acetic anhydride to pyridine can vary from just above zero to infinite mixtures.

In addition to acetic anhydride, lower fatty acid anhydrides and aromatic monobasic acid anhydrides may be used. The lower fatty acid anhydrides include propionic, butyric, valeric, and the like.

The aromatic monobasic acid anhydrides include the anhydride of benzoic acid and those of the following acids: o-, m-, and p-toluic acids; m- and p-ethyl benzoic acids; p-propyl benzoic acid; p-isopropyl benzoic acid; anisic acid; o-, m- and p-nitro benzoic acids; o-, m-, and p-halo benzoic acids; the various dibromo and dichloro benzoic acids; the tribromo and trichloro benzoic acids; and the like.

Tertiary amines having approximately the same activity as the preferred pyridine can be used in the process. These include isoquinoline, 3,4-lutidine, 3,5-lutidine, 4-methyl pyridine, 3-methyl pyridine, 4-isopropyl pyridine, N,N-dimethyl benzyl amine, 4-benzyl pyridine, and N,N-dimethyl dodecyl amine. These amines are generally used from 0.3 to equimolar amounts with that of the anhydride converting agent. Trimethyl amine and triethylene diamines are much more reactive, and therefore are generally used in still smaller amounts. On the other hand, the following operable amines are less reactive than pyridine: 2-ethylpyridine, 2-methyl pyridine, triethyl amine, N-ethyl morpholine, N-methyl morpholine, diethyl cyclohexylamine, N,N-dimethyl cyclohexylamine, 4-benzoyl pyridine, 2,4-lutidine, 2,6-lutidine and 2,4,6-collidine, and are generally used in larger amounts.

An alternative method for the preparation of the polyimides is the thermal dehydration of the intermediate poly(amide-acid) (33). This transformation is generally performed in bulk, preferably using a shaped article, e.g., film or filament of the polymeric acid. The dehydration is conducted stepwise starting at temperatures of about 100° C. and increasing the temperature progressively to about 300° C. or even higher, depending on the particular case, towards the end of the imidization step. The reaction is preferably performed under an inert atmosphere; atmospheric or reduced pressures can be employed.

The polyimides can also be prepared by the interaction of the dianhydride with a diisocyante as shown in equation (V):

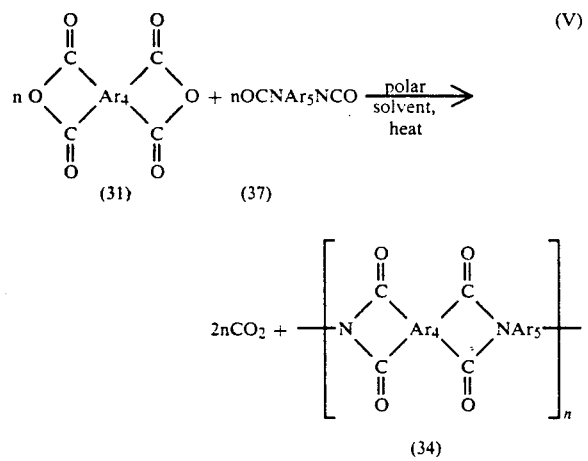

wherein $Ar_4$ and $Ar_5$ are as defined above.

The polyimide forming reactions are conducted in a nitrogen-containing solvent. The specific solvent will depend on the particular aromatic polyimide used. In most cases the solvent is an aprotic organic compound having a dielectric constant between 35 and 45, preferably one which is water soluble. Representative aprotic compounds are N,N-dimethylformamide; N,N-diethylformamide; N,N-dimethylmethoxyacetamide; N-methyl caprolactam, caprolactam; N,N-dimethylacetamide; N,N-diethylacetamide; dimethyl sulfoxide; N-methylpyrrolidone; tetramethylurea; hexamethylphosphoramide; N,N,N',N'-tetramethylethylmalonamide; N,N,N',N'-tetramethylglutaramide; N,N,N',N'-tetramethylsuccinamide; thiobis(N,N-dimethylcarbamylmethyl) ether; N,N,N',N'-tetramethylfuraramide; methylsuccinonitrile; N,N-dimethylcyanoacetamide; N,N-dimethyl-alpha-cyanopropionamide; N-formylpiperidine and butyrolactone;. Preferred solvents are dimethylformamide; dimethylacetamide; N-methyl-pyrrolidone and N-methylcaprolactam, diaryl sulfones such as diphenyl sulfone and diaryl ketones such as benzophenone.

The reaction temperature is within the range of about 50° C. to about 200° C., and preferably, from about 100° C. to about 150° C. The polymerization may be performed in the presence or in the absence of a catalyst. Advantageously, the reaction is carried out in the presence of a catalyst for the reaction of an isocyanate and a carboxylic acid and/or anhydride group. Such catalysts are well known in the art; as described in, for example, U.S. Pat. No. 3,701,756. Illustrative catalysts include the alkali metal salts of lactams such as sodium, potassium and lithium butyrolactamates, sodium, potassium and lithium valerolactamates, sodium, potassium and lithium caprolactamates, alkali metal alkoxides and aryloxides such as sodium, potassium and lithium methoxides, ethoxides, butoxides, and phenoxides, and the like.

The reaction between the diisocyanate and the dianhydride is carried out under substantially anhydrous conditions and the progress of the reaction can be followed by any of the routine analytical techniques such as following the viscosity increase of the reaction solution or the evolution of carbon dioxide. The polyimides produced by the reaction remain in solution and can be used as such or can be precipitated therefrom by addition of an appropriate liquid in which the polyimide is insoluble or has low solubility.

Other useful reaction catalysts are the metal acetylacetonates which are described in, for example, U.S. Pat. No. 4,421,905. The catalysts

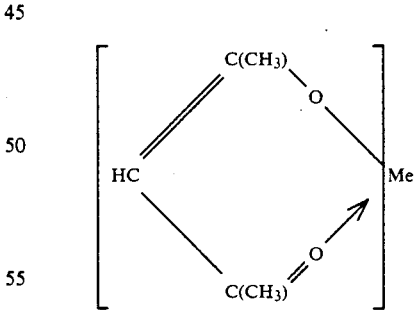

have the formula above; when the metal (Me) is Al, Co, Fe and Ni, n has a value of 3, and when the metal (Me) is Zr, n has a value of 4.

The acetylacetonate-promoted reaction is advantageously conducted at a temperature in the range of about 70° C. to 150° C., preferably in the range of about 100° C. to 140° C. When the temperature is in the upper portion of these ranges, the imidization reaction is substantially completed in 2 to 4 hours.

The metal acetylacetonate is advantageously used in an amount of at least 0.005 gm, preferably at least 0.01 gm per equivalent weight of dianhydride and generally there is no need to exceed 1 gm of metal acetylacetonate to obtain the desired results. Advantageously, the metal acetylacetonate is used in an amount of 0.005 to 1 gm of metal acetylacetonate, preferably 0.01 to 0.05 gm per gm of aromatic dianhydride.

Better thermal stability is achieved by capping the polyimides with either a monoanhydride or a monoisocyanate. Typical capping reagents are phthalic anhydride, phenyl isocyanate, p-methylphenyl isocyanate, the isocyanate (38) and the anhydride (36).

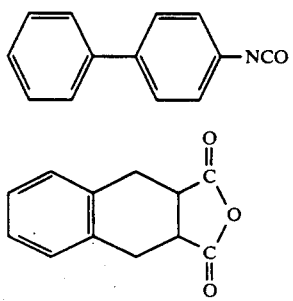

The preparation of the poly(amide-imides) is performed using reactions that are similar to those discussed for the preparation of the polyamides and of the polyimides. Typically, a tricarboxylic acid monoanhydride or derivative thereof is used as shown in equation (VI) and as described in, for example, Japanese Patent Applications 61/126,136 and 61/126,137.

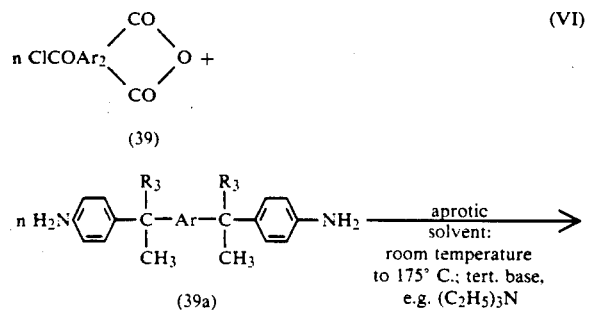

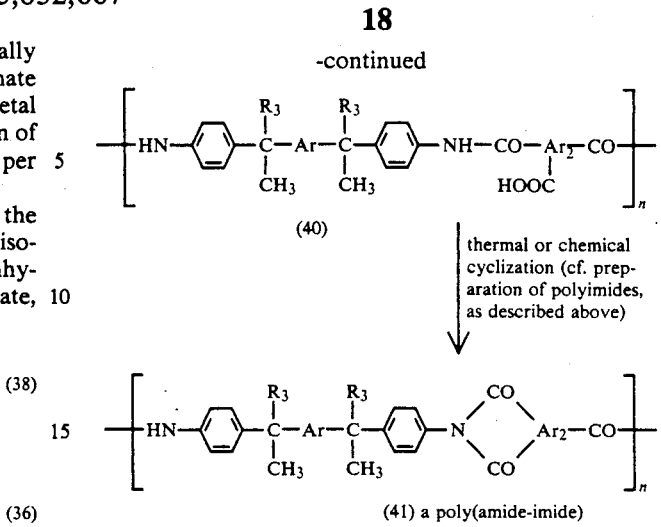

Typical aprotic solvents which are the same as those used for polyimides, e.g., N,N-dimethylacetamide or N-methylpyrrolidone, and the like are useful. In another embodiment, these polymers can be prepared via the reaction of diisocyanate with tricarboxylic acid monoanhydride; the reaction is base-catalyzed, see for example, Japanese Patent Application 61/14,218; it is illustrated in equation (VII):

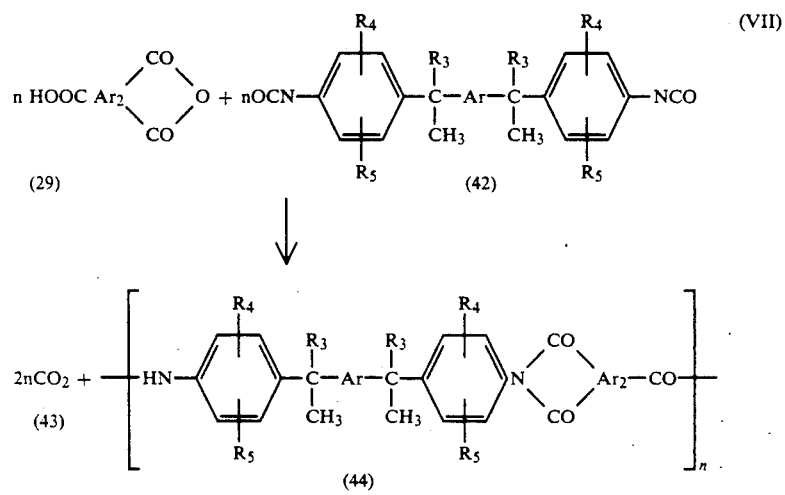

Experimental details are generally the same as those described for the corresponding preparation of the polyimides.

In addition to the reaction of a diamine or derivative thereof with a tricarboxylic acid monoanhydride or derivative thereof, the poly(amide-imides) of the instant invention may also be prepared via the routes shown in equations (VIII)-(XI). The chemistry of these routes is the same as that described above for the preparation of polyamides, poly(amide-imides) and polyimides. Note that the terms dicarboxylic acid, tricarboxylic acid monoanhydride, and diamine are meant to include appropriately reactive derivatives thereof as required for the polymerizations. Thus, the term dicarboxylic acid includes also the corresponding acid chloride; the term diamine includes also the corresponding di-N-acylated derivative; these latter materials were shown to be very useful for the preparation of poly(amideimides) . . . see Keske, Polymer Preprints, Vol. 25, No. 2, p. 12 (1984).

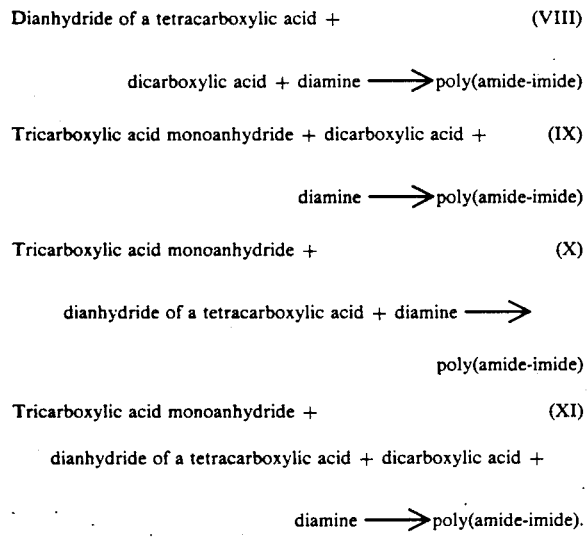

The materials useful in the equations (VIII)–(XI) are as defined above.

Molecular weight control and improved thermal stability are obtained by using appropriate end-capping reagents such as monoanhydrides, monoamines, monoacids or monoisocyanates.

The polyamides, poly(amide-imides) and polyimides of the instant invention can be homopolymers, random copolymers, and block copolymers. They have generally number average molecular weights of at least 5,000 and preferably in the range of 8,000 to 50,000 and higher. Reduced viscosities of the polymers as measured in N-methylpyrrolidone or in another appropriate solvent, at concentrations of 0.5% by weight and at 25° C. are at least 0.1 dl/gm and preferably in the range of 0.3 up to 1.5 dl/gm and higher.

The polymers of this invention may include mineral fillers such as carbonates including chalk, calcite and dolomite; silicates including mica, talc, wollastonite; silicon dioxide; glass spheres; glass powders; aluminum; clay; quartz; and the like. Also, reinforcing fibers such as fiberglass, carbon fibers, and the like may be used. The polymers may also include additives such as titanium dioxide; thermal stabilizers, ultraviolet light stabilizers, plasticizers, and the like.

The polymers of this invention are also useful in blends with other thermoplastics. Thus, these polymers may be blended with other known aromatic polyamides, poly(amide-imides), and polyimides; as well as with polyarylketones, poly(aryl ether ketones), poly(aryl ethers), polyarylates, poly(arylate-carbonates), polycarbonates, poly(phenylene oxides), polyamides such at the nylons 66 and 6, polyesters such as the poly(alkylene terephthalates), and the like.

The polymers of this invention may be fabricated into any desired shape, i.e., moldings, coatings, films, or fibers. They are particularly desirable for use as electrical insulation for electrical conductors.

Also, the polymers may be woven into monofilament threads which are then formed into industrial fabrics by methods well known in the art as exemplified by U.S. Pat. No. 4,359,501. Further, the polymers may be used to mold gears, bearings and the like.

EXAMPLES

The following examples serve to give specific illustrations of the practice of this invention but they are not intended in any way to limit the scope of this invention.

EXAMPLE I

Preparation of $\alpha,\alpha'$-Bis(p-Amino-Phenyl)-4,4'-Bis(isopropyl)Biphenyl (a) 4,4' Diacetyl Biphenyl To a solution of 90.8 g anhydrous aluminum chloride and 45.4 g of acetyl chloride in 50 ml methylene chloride, cooled to $-15°$ to $-10°$ C., was added dropwise, a solution of 42.5 g biphenyl in 50 ml methylene chloride. The addition took 20 minutes and the temperature during the addition was maintained at $-15°$ to $-10°$ C. Following complete addition, the mixture was stirred at $-10°$ C. to $+5°$ C. for 3 additional hours and then allowed to stand overnight. The reaction mixture was slowly added to 3 liters of water and the methylene chloride was allowed to evaporate leaving behind an off-white solid which was collected by filtration. Upon crystallization from xylene, a white solid, with a melting point of 195° C., was obtained in a yield of 90%.

(b) $\alpha,\alpha'$-Dihydroxy-4,4' Bis (Isopropyl) Biphenyl

Methyl magnesium bromide (150 ml. 0.3 moles, i.e. 150 mole % excess, of a two molar solution in tetrahydrofuran) was cooled to $-10°$ C.; a solution of 14.4 g (0.06 mole) of the diketone from (a) above in 160 ml of toluene was added with stirring during a 45 minute period. The temperature was maintained at $-10°$ C. The reactants were stirred for an additional hour and poured into a mixture of crushed ice and 13 ml conc. $H_2SO_4$. The organic layer was separated, washed to pH 7 with water, dried with anhydrous magnesium sulfate, filtered and the solvent was removed under vacuum without heating. A white solid residue was obtained; it was recrystallized from acetone. The product was recovered in 90% yield, m.p. 161° C.

(c) Preparation of 4,4'-Bis-(1-methylvinyl) Biphenyl

A solution of 36 g (0.13 mole) of the above dialcohol in 500 ml xylene containing 12 drops of 85% phosphoric acid was refluxed for 3 hours at which time water no longer evolved. The solvent was stripped and the residue was recrystallized from N,N-dimethylformamide. It had m.p. 182° C., and the yield was 93%.

(d) Preparation of $\alpha,\alpha'$-Bis(p amino phenyl) -4,4'-Bis (Isopropyl)Biphenyl A mixture of 83 g (0.89 mole) aniline and 11.3 g super Filtrol #1 acid clay was refluxed until no additional water came overhead. A solution of 109.9 g (0.47 m) of 4,4'-bis(1-methyl vinyl)biphenyl in 252 g (2.7 m) of aniline was added over a 15-minute period. The mixture was refluxed for 2 hours and filtered through a celite pad. The catalyst was washed with 75 ml toluene. The toluene and excess aniline were stripped under reduced pressure; 213 g of a residue were obtained. It was recrystallized from a 1:1 (by vol.) mixture of heptane:toluene to provide 163 g of product. A crude melting point was 218°–225° C. Both IR and NMR confirmed the product structure. Titration with 0.1N perchloric acid indicated a purity of 96%.

EXAMPLE II

Synthesis of Bis[4(1-p-Amino Phenyl-1-Methyl-Ethyl)Phenyl] Ester (a) Bis-(4-Acetyl Phenyl) Ether Acetyl chloride 45.4 grams, powdered aluminum chloride 90.8 grams and methylene chloride were cooled to −30° C. Diphenyl ether, 46.4 grams, in 30 ml methylene chloride was added slowly during a 60 minute period, keeping the temperature at approximately −30° C. The mixture was stirred at −10° C. for 2 hours and left at 20° C. overnight. The mixture was poured onto crushed ice, and extracted into methylene chloride, the organic solution was dried, filtered and the solvent stripped. Upon recrystallization from ethanol, a white solid, melting point 102° C., was obtained. The yield was 63 grams, i.e., 90%.

(b) Bis(4-[1-hydroxy-1-methyl ethyl]diphenyl)ether

An amber solid, melt point 93°–94° C., was obtained by the reaction of 25.4 g of bis(4-acetyl phenyl) ether with 125 ml of 1 molar solution of methyl magnesium bromide in a mixture of 80 ml benzene/40 ml diethyl ether. The reaction was followed by the decomposition of the complex with crushed ice/10% HCl. The organic solution was washed with water to pH7 and dried. Filtration and removal of solvent at 30° C. (without heat by flash evaporation) yielded the final product.

(c) The dehydration of the above ditertiary alcohol was achieved by refluxing 28.6 grams of the product from (b) in 100 ml of xylene. The yield was 90% and the product melted at 107° C.

(d) The above diolefin, 134.4 grams, is reacted with 11.3 grams of Super Filtrol #1 acid clay (obtained from Kaiser Aluminum) and 335 grams of aniline for a period of 2 hours. The reaction mixture is cooled, and filtered through a celite pad. The aniline is stripped leaving behind a residue which is recrystallized from a 1:1 heptane:toluene mixture. A yield of about 70% of product is obtained. The product structure, is confirmed by IR and NMR spectroscopy.

EXAMPLE III

Refluxing the above diolefin, 4,4'-bis(1-methyl vinyl)-diphenyl ether, with an excess of 2,6-dimethyl aniline and Super Filtrol #1 acid clay leads to the formation of 4,4'-bis(1-methyl-4'-amino-3', 5'-dimethylphenyl ethyl)-diphenyl ether.

Using similar techniques the following were prepared:

The corresponding diamine is obtained by the condensation of aniline with 4,4'-bis(1-methyl vinyl phenoxy)biphenyl using the Filtrol #1 acid clay catalyst.

In addition the following diamines are prepared using the techniques of the preceding examples.

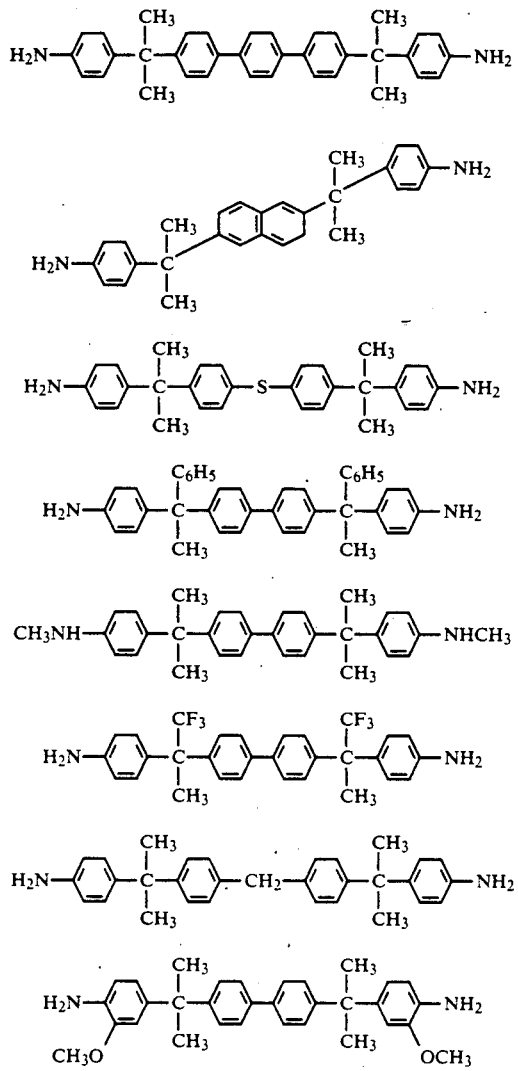

| COMPOUND | REACTANTS | M.P. |
|---|---|---|
| 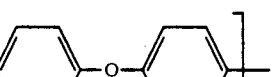 | 4,4'-bis(p-phenoxy) biphenyl 169 g acetyl chloride 94.2 g; AlCl₃ 187 g CH₂Cl₂ 150 ml | 225° C. |
|  | 4,4'-bis[p-acetyl-phenoxy] biphenyl 90 g CH₃Mg Br (2 molar solution in tetrahydrofuran) 568 ml | 169° C. |
| 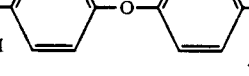 | 4,4'-bis(p(α-methyl,α-hydroxy-ethyl-phenoxy)biphenyl 71 g H₃PO 30 drops xylene 1000 ml | 213° C. |

-continued

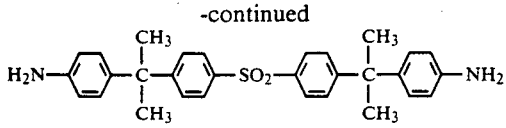

EXAMPLE IV

Preparation of α,α'-bis(3,4-dicarboxyl phenyl), 4,4'-diisopropylbiphenyl dianhydride

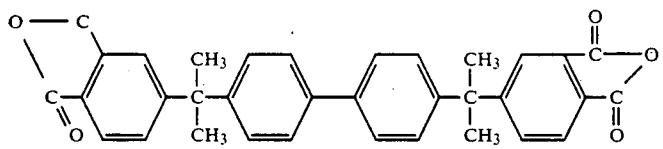

(a) Condensation of o-xylene with α,α'-dihydroxy 4,4'-bis(isopropyl) biphenyl

A one-liter resin flask fitted with a stirrer, condenser and solid addition flask is charged with 300 ml of o-xylene and cooled to 0° C. Ferric chloride, 200 g, is added slowly over a 30 minutes period. Following this, 55.6 grams of solid α,α'-dihydroxy-4,4' bis(isopropyl)-biphenyl is added over a two hour period keeping the temperature at 0° C. Upon complete addition, the reaction mixture is stirred for an additional 4 hours at 0° C., allowed to warm to room temperature and poured onto ice. The organic layer is separated, dried, stripped and isolated by distillation. The product, α,α'-bis(3,4-dimethylphenyl)-4,4'-bis(isopropyl) biphenyl, is recrystallized from 95% ethanol.

(b) Preparation of α,α'-bis(3,4-dicarboxyphenyl)-4,4'-bis(isopropyl) biphenyl

To a mixture of 400 ml pyridine and 110 ml water are added 48.2 grams of the dixylene derivative of above; potassium permanganate (190 g) is slowly added to the well stirred and refluxing mixture over a one hour period. The mixture is refluxed for an additional 4 hours, then the hot mixture is filtered to remove manganese dioxide. The filtrate is concentrated and pyridine is removed on a rotary evaporator. The residue is acidified to pH 1 with 1N HCl to precipitate the tetra acid.

(c) Cyclization of the tetra acid to the dianhydride

The above tetra acid is treated with 4 molar equivalents of acetic anhydride as a 40% solution in acetic acid; the mixture is refluxed for 3 hours, and cooled; the product crystallizes out of solution and is recovered by filtration, washed with hexane and dried.

Its structure is verified by determining its neutralization equivalence, and by using IR and NMR techniques.

Similarly, the following compounds are prepared:

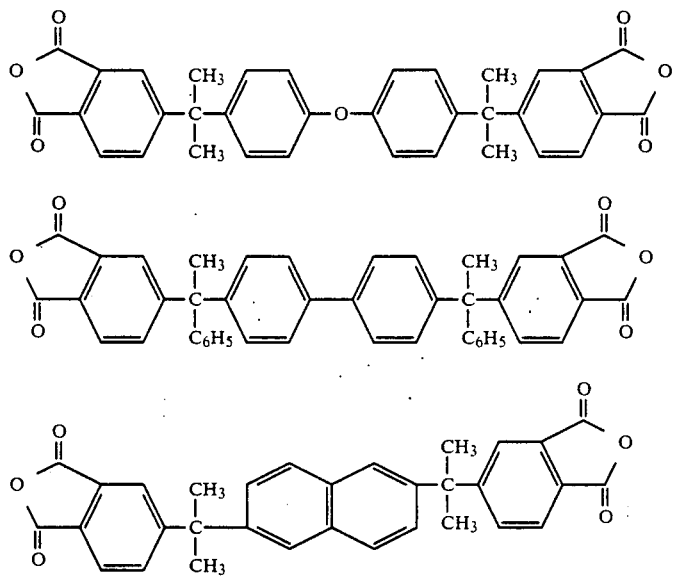

EXAMPLE V

Preparation of α,α'-bis(4-carboxy phenyl) 4,4'-bis(isopropyl)biphenyl

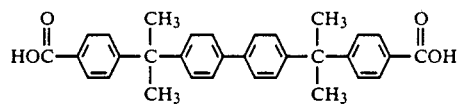

The condensation of toluene with α,α'-dichloro-4,4'-bis(isopropyl) biphenyl employing a catalyst composed of a complex of aluminum chloride with nitromethane is carried out by the procedure taught by A. T. Coscia, J. T. Penniston, and John C. Petropoulus, J. Org. Chem., 26, 1398, 1961.

The α,α'-dichloro-4,4'-bis(isopropyl)biphenyl is obtained by the low temperature, (0°-10° C.) addition of a 50% solution of 4,4'-diisopropenylbiphenyl in toluene to a saturated solution of hydrogen chloride gas in toluene over a period of from 60 to 90 minutes.

In a typical reaction toluene is used both as a solvent and reactant and typically 9-15 mole excess of toluene is utilized. The ratio of catalyst to alkylating agent is 0.1 and the catalyst is a 1:1 molar complex of aluminum chloride to nitromethane. The reaction is run at 0° C. under a steady stream of hydrogen chloride gas. Upon completion of the reaction (about 2 hours), the reaction mixture is poured slowly into ice water, the organic layer is separated, washed with 10% aqueous sodium hydroxide, water, dried and the product is recovered by distillation.

α,α-bis(4-carboxyphenyl)-4,4'-bis(isopropyl)biphenyl is obtained by the chromic acid oxidation of α,α'-bis(p-tolyl)-4,4'-bis(isopropyl)biphenyl in a solution of acetic acid, water and sulfuric acid.

Thus, to a refluxing mixture of 8 grams of the above crude α,α'-bis(p-tolyl)-4,4'-bis(isopropyl) biphenyl in 250 ml acetic acid, 300 ml water and 50 ml sulfuric acid are added very slowly 70 grams of chromic acid over a ½ hour period. The reaction mixture is refluxed for 16 hours, diluted with water and filtered to remove the product.

The structure of the diacid is confirmed by titration, IR and NMR.

PREPARATION OF THE POLYMERS

Method A

Preparation of the Polyimides

A three-liter three-necked flask equipped with a stirrer, Dean Stark trap, thermometer and heating mantle is purged with nitrogen. A solution of 0.100 moles of the diamine in about 575 g of m-cresol is added and stirred for 10 minutes. 0.099 moles of the dianhydride, 0.003 moles of phthalic anhydride, 0.1 grams of p-toluene sulfonic acid, and about 250 grams of xylene are now charged and the mixture is stirred for about 30 minutes. The mixture is then heated to reflux (156° C.) over a two-hour period and refluxed for 4 hours. The reaction mixture is cooled; the polymer is precipitated in methanol, filtered and reslurried in methanol. The slurry is boiled for 2 to 10 hours, filtered and the polymer is dried in a vacuum oven at 90° C. overnight.

Method B

Preparation of the Polyamide-imides

A 0.05 mole quantity of the aromatic diamine is placed in a 500 ml round bottomed flask containing 120 to 200 g of N,N-dimethylacetamide (DMAC). Upon dissolving, the solution is cooled to 0° C. and 0.05 moles of the tricarboxylic anhydride acid chloride are added. The solution is allowed to come to room temperature while being stirred, at which point 0.15 moles of pyridine are added. The solution, which is often yellow, is stirred for 2 to 15 hours, then treated with about 120 g of DMAC, an additional 0.15 moles of pyridine and 0.30 moles of acetic anhydride. The solution is heated for about one to five hours at 90°-100° C. The resulting solution or semisolid is coagulated into excess methanol. The fluff is reslurried in methanol and boiled for several hours. Following collection of this fluff by filtration, the polymer is dried in a vacuum oven at 90° C. for 16 hours.

Method C

Preparation of the Polyamides

The polymerization is performed in a one liter four-necked flask equipped with a mechanical stirrer, thermometer, dry-nitrogen sparge, and an addition funnel. Circulation of nitrogen is started and 0.10 moles of the diamine are dissolved in about 500 ml of the solvent, e.g., N,N-dimethylacetamide. The solution is cooled to 0° C. at which point 0.10 moles of the diacid chloride, followed by a stoichiometric excess (0.25 to 0.4 moles) of the acid acceptor (triethylamine or pyridine) are added. Stirring is continued at 0° C. for about 2 to 4 hours; the mixture is then allowed to reach room temperature and an additional 0.2 to 0.8 moles of the acid acceptor are added. The reaction mixture is heated to about 50°-75° C. for about 2 to 4 hours; it is then cooled to room temperature and stirred overnight.

The polymer solution or gel is coagulated in excess methanol. The polymer is collected via filtration; it is reslurried in about one liter of distilled water, boiled for several hours (4-8 hours), filtered and dried till constant weight.

The table that follows lists the polymers that are prepared.

TABLE

| Preparative Method | Acid Derivative (Acid Chloride, Anhydride, etc.) | Diamines | Approximate Tg Range (°C.) |
|---|---|---|---|
| A | 3,3',4,4'-biphenyltetracarboxylic dianhydride | 4,4'-bis(4-aminophenyl-isopropylidene)biphenyl | 290–300 |
| A | 2,2-bis[4-(3,4-dicarboxyphenyl)phenyl]propane dianhydride (biphenyl-bridged) | p-phenylenediamine | 285–295 |
| B | trimellitic anhydride chloride | 4,4'-bis(4-aminophenyl-isopropylidene)biphenyl | 280–290 |
| B | trimellitic anhydride chloride | 2,6-bis[2-(4-aminophenyl)-2-propyl]naphthalene | 275–285 |

TABLE-continued
| Preparative Method | Acid Derivative (Acid Chloride, Anhydride, etc.) | Diamines | Approximate Tg Range (°C.) |
|---|---|---|---|
| A | 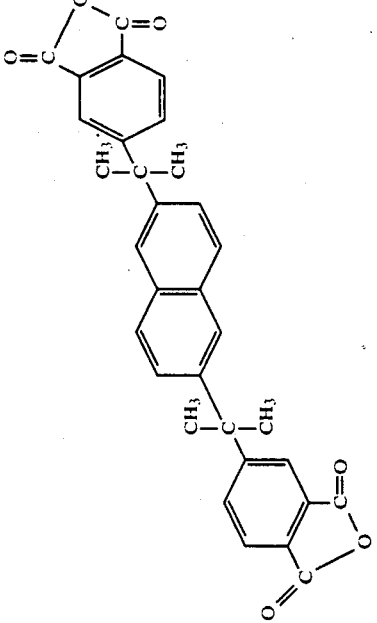 | 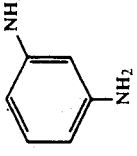 | 255–265 |
| | | 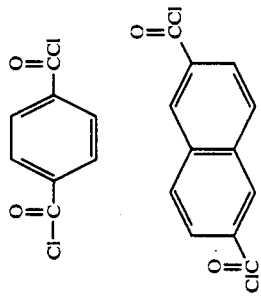 | 275–285 |
| C | 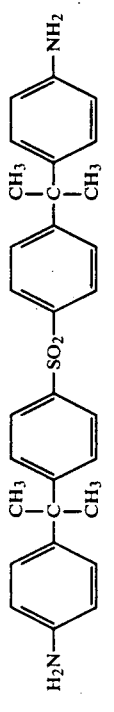 | 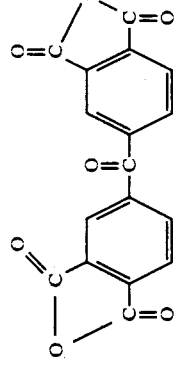 | — |
| A | 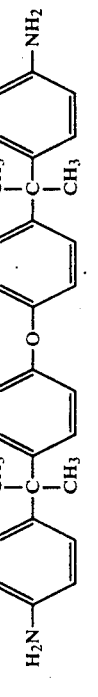 | | 220–230 |

What is claimed is:

1. Poly(amide-imides) derived from the following monomers:

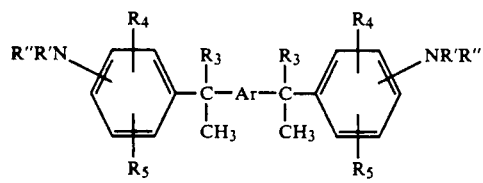

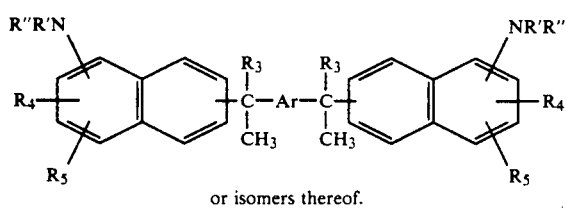

or isomers thereof.

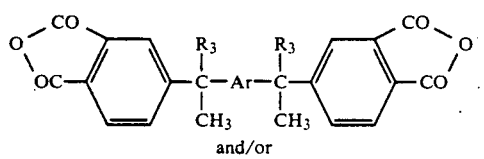

and/or

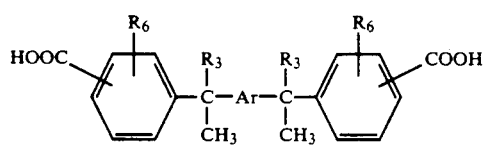

wherein R' and R" are independently hydrogen, straight chain or branched $C_1$ to $C_{10}$ alkyl and $C_6$ to $C_{20}$ aryl groups; at least one of R' or R" is hydrogen where amide bonds are formed; both R' and R" are hydrogens in cases where imide bonds are formed; $R_3$ is a phenyl, a $CF_3$ or an alkyl group having from 1 to 10 carbon atoms; $R_4$ and $R_5$ are independently hydrogen, halogen, alkyl or alkoxy groups having from 1 to 4 carbon atoms, or aryl and aryloxy groups having from 6 to 20 carbon atoms; $R_6$ is hydrogen or an alkyl having more than one carbon atom, an aryl or aryloxy having from 6 to 20 carbon atoms; and Ar is

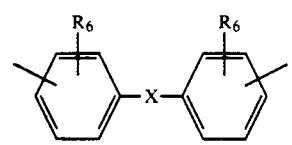

wherein X can be a chemical bond, O, S, SO, $SO_2$,

$CH_2$, an alkylene or alkylidene having from 2 to 8 carbon atoms, a cycloalkylene or cycloalkylidene having from 5 to 14 carbon atoms, or a phenylene group which may be substituted by an alkyl or alkoxy group having from 2 to 4 carbon atoms, or by a halogen; the group Ar may also be selected from

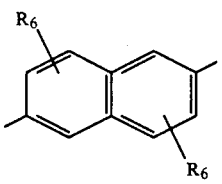

or an isomer thereof;

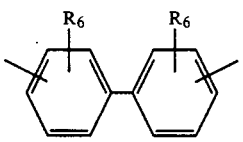

or an isomer thereof;

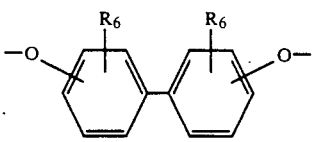

or an isomer thereof; and wherein the subject monomers are used in an amount of at least 50 mole % based on the total monomers used.

2. Poly(amide-imides) according to claim 1 wherein $R_3$ is methyl.

3. Poly(amide-imides) according to claims 1 or 2 which contain one or more of the following monomers $H_2NAr'NH_2$, HOOC-Ar"-COOH where Ar' and Ar" are divalent aromatic radicals,

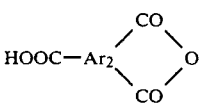

where $Ar_2$ is a trivalent aromatic radical, and

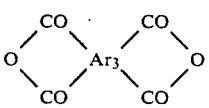

where $Ar_3$ is a tetravalent aromatic radical.

4. Poly(amide-imides) according to claim 3, wherein Ar' is of the formulae

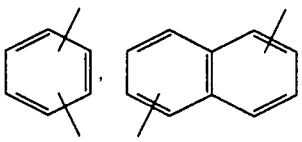

or isomers thereof, and

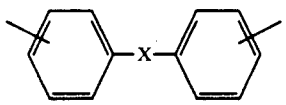

where X is as defined in claim 1; Ar" is Ar' or

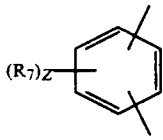

where $R_7$ is a straight chain or branched $C_1$ to $C_8$ alkyl group, a halogen, or a $C_1$ to $C_8$ straight chain or branched alkoxy group and where Z can be 1, 2, or 3 and $Ar_2$ is

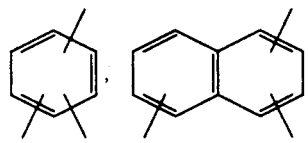

or isomers thereof, and

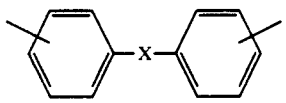

where X is as defined in claim 1.

5. Poly(amide-imides) according to claims 1 or 2 or 3 or 4 which contain up to 25 mole % (based on the total amine monomers) of a straight chain or branched aliphatic or of an arylaliphatic diamine.

6. Poly(amide-imides) according to the claims 1 or 2 or 3 or 4 or 5 which contain up to 25 mole % (based on the total acid monomers) of a straight chain or branched aliphatic diacid or of an arylaliphatic diacid.

7. A poly(amide-imide) according to claims 1 or 2 or 3 or 4 or 5 which is the reaction product of a diamine and a tricarboxylic acid mono-anhydride or derivative thereof.

8. A poly(amide-imide) according to claims 1 or 2 or 3 or 4 or 5 or 6 which is the reaction product of a dianhydride of a tetracarboxylic acid, a dicarboxylic acid, and a diamine or derivatives thereof.

9. A poly(amide-imide) according to claims 1 or 2 or 3 or 4 or 5 or 6 which is the reaction product of a tricarboxylic acid monoanhydride, a dicarboxylic acid, and a diamine or derivatives thereof.

10. A poly(amide-imide) according to claims 1 or 2 or 3 or 4 or 5 or 6 which is the reaction product of a tricarboxylic acid monoanhydride, a dianhydride of a tetracarboxylic acid, and a diamine or derivatives thereof.

11. A poly(amide-imide) according to claims 1 or 2 or 3 or 4 or 5 or 6 which is the reaction product of a tricarboxylic acid monoanhydride, a dianhydride of a tetracarboxylic acid, and a dicarboxylic acid, and a diamine, or derivatives thereof.

12. A poly(amide-imide) comprising repeating units of the formula

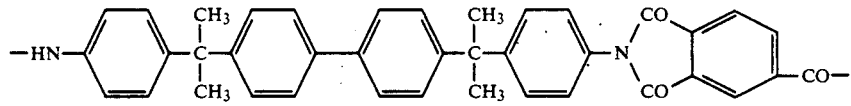

13. A poly(amide-imide) comprising repeating units of the formula

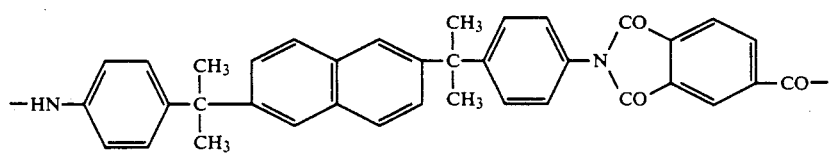

14. A process for the preparation of an aromatic poly(amide-imide) comprising
    (a) reacting a diamine with a monoanhydride of a tricarboxylic acid or derivative thereof in a solvent to form the intermediate poly(amide-acid), then
    (b) chemically or thermally cyclizing the intermediate poly(amide-acid) to the poly(amide-imide).

15. A process according to claim 14 where the solvent is a diaryl sulfone or a diaryl ketone.

16. A process according to claims 14 or 15 where the diaryl sulfone is diphenyl sulfone.

17. A process according to claims 14 or 15 where the diaryl ketone is benzophenone.

18. A process for the preparation of an aromatic poly(amide-imide) comprising reacting an aromatic diisocyanate with a with a monoanhydride of a tricarboxylic acid in a solvent, optionally in the presence of a catalyst.

19. A process according to claim 18 where the solvent is a diaryl sulfone or a diaryl ketone.

20. A process according to claims 18 or 19 where the diaryl sulfone is diphenyl sulfone.

21. A process according to claims 18 or 19 where the diaryl ketone is benzophenone.

* * * * *